June 24, 1958 D. J. HAMILTON 2,840,726

TRANSISTOR CURRENT GATE

Filed Feb. 2, 1956 2 Sheets-Sheet 1

DOUGLAS J. HAMILTON,
INVENTOR

BY [signature]

ATTORNEY

June 24, 1958 D. J. HAMILTON 2,840,726

TRANSISTOR CURRENT GATE

Filed Feb. 2, 1956 2 Sheets-Sheet 2

DOUGLAS J. HAMILTON,
INVENTOR

BY [signature]
ATTORNEY 2,840,726
Patented June 24, 1958

2,840,726

TRANSISTOR CURRENT GATE

Douglas J. Hamilton, Santa Monica, Calif., assignor to Hughes Aircraft Company, Culver City, Calif., a corporation of Delaware Application February 2, 1956, Serial No. 562,971
10 Claims. (Cl. 307—88.5)

This invention relates generally to gating circuits and, more particularly, to transistor gating circuits utilizing current pulses as distinguished from voltage states to convey information.

Information for use in digital computers is usually stored in some readily available form such as punched tapes, punched cards, or is magnetically recorded on a tape or drum. The latter method, that is, magnetic storage, is currently being used to a large extent. In utilizing information stored magnetically, it must generally be converted from the form in which it was removed from the storage medium into pulses for application to circuits within a digital computer.

In the past this was done by the use of vacuum tube amplifiers and limiters in conjunction with diode resistor gates. This method of conversion produces voltage state signals. While this method is quite adequate for use with vacuum tube flip-flops and may be used with transistor flip-flops, there are some disadvantages which should be overcome when using the latter.

In the use of voltage state gating, considerable power is consumed in the resistors used as components in the gates. Another feature that is undesirable when transistors are used in the computer flip-flops is the fact that gate return voltages must be comparatively large with respect to the voltages normally employed with transistors. This necessitates, as a general rule, coupling capacitors between the gates and the flip-flop input. This in turn necessarily introduces a time delay due to the time required for charging and discharging of the capacitor which is undesirable in many applications.

It is therefore an object of the present invention to provide an improved gate for converting output signals from magnetic storage media into signals usable with transistor flip-flops in digital computers.

Another object of the present invention is to provide a gate which utilizes and capitalizes on the fact that transistors are essentially current devices.

Still another object of the present invention is to provide a gate circuit which eliminates the need for a coupling capacitor between the gate and the flip-flop input, thus eliminating a heretofore inherent time lag.

A still further object of the present invention is to provide a gating circuit which has current gain.

A transistor current gate in accordance with the present invention includes a source of input signals. Two junction transistors are coupled to the source. Connected to the output of each of the transistors are two current flow paths. Control means is connected to one path of each of the transistors for switching output current from the transistors either toward or away from a load device in response to control signals being applied thereto.

The novel features of the present invention are set forth in particularity in the appended claims. Other and more specific objects of the present invention will be apparent from a consideration of the following description taken in connection with the accompanying drawings in which like components are designated by the same reference characters, and in which:

Figure 1:
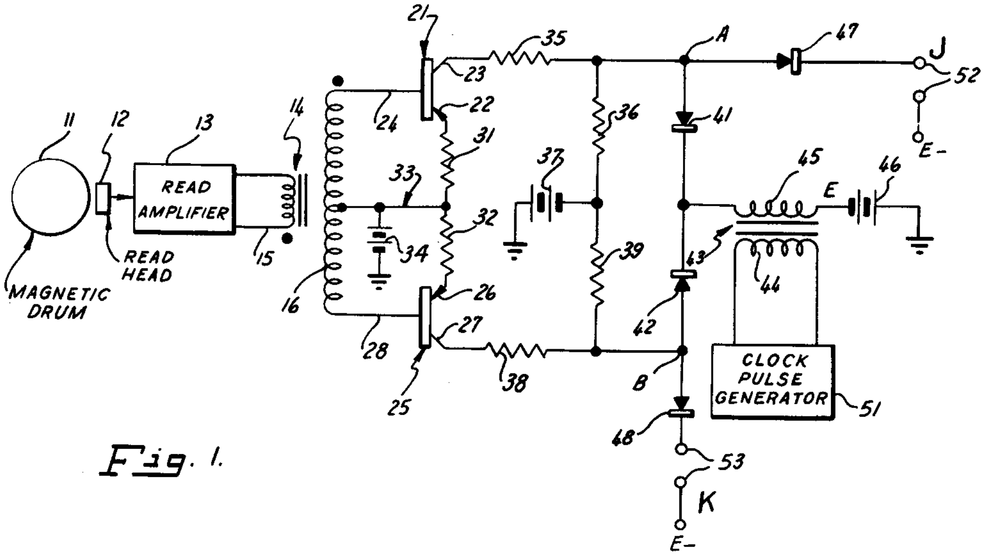
Fig. 1 is a schematic circuit diagram of one embodiment of the current gate of the present invention.

Referring now to the drawings and more particularly to Fig. 1, there is shown a magnetic drum represented by circle 11 upon which information may be magnetically stored in any of the manners well known to the art. In the preferred embodiment of the present invention, the Manchester (Ferranti) method of recording and reading is utilized. The Manchester method of recording and reading is a non-return-to-zero system which differs from the conventional non-return-to-zero system in that two current states of equal duration and opposite polarity are used during one clock pulse interval to record a binary one or zero instead of the conventional one current state during the clock pulse interval. Adjacent the magnetic drum is a magnetic reading head 12 which transforms the magnetically stored information into a voltage signal which is then applied to a read amplifier represented by rectangle 13. The read amplifier may limit the signal which is obtained from the magnetic drum as well as amplifying it. The output from read amplifier 13 is then applied to primary winding 15 of transformer 14. Transformer 14 is used to couple the output signal of the read amplifier to the subsequent stages of the current gate of the present invention.

There is next shown a transistor 21 having an emitter 22, a collector 23, and a base 24. Also shown is another transistor 25 having an emitter 26, a collector 27, and a base 28. Transistors 21 and 25 may be P-N-P transistors as shown by the accepted schematic symbol, and in the present embodiment are junction transistors. Secondary winding 16 of transformer 14 is connected across bases 24 and 28, the transformer being used to apply the output signal from read amplifier 13 to the transistors.

Resistors 31 and 32 are connected in series between emitters 22 and 26. A lead 33 is used to connect the junction between resistors 31 and 32 to the center tap of secondary winding 16. Connected between lead 33 and ground is a source of operating potential such as battery 34 which is poled in such a manner as to apply a positive potential to emitters 22 and 26 and bases 24 and 28. Resistors 35 and 36 are connected in series between collector 23 and the negative terminal of another source of operating potential such as battery 37 which has its positive terminal grounded. Resistors 38 and 39 are connected in series between collector 27 and the negative terminal of battery 37. Resistors 35 and 38 are utilized to limit the dissipation of transistors 21 and 25, thus prohibiting the rated power dissipation of the transistors from being exceeded. If the remaining components of the circuit are properly chosen so that rated dissipation will never be exceeded, resistors 35 and 38 may be eliminated without affecting the operation of the circuit.

The anode of diode 41 is connected to the junction between resistors 35 and 36, while the anode of diode 42 is connected between the junction of resistors 38 and 39. The cathodes of diodes 41 and 42 are connected together. Diodes 41 and 42 provide a first current flow path for transistors 21 and 25, respectively, and also operate as current switches as hereinafter described. Connected between the junction between the cathodes of diodes 42 and the negative terminal of a source of biasing potential, such as battery 46, is the secondary winding 45 of a transformer 43, the positive terminal of battery 46 being grounded. Primary winding 44 of transformer 43 is connected across the output of a clock pulse generator represented by rectangle 51. Transformed 43 is used to apply clock pulse signals to the gating circuit which operates as control signals, as hereinafter described. Another diode 47 is connected between the anode of diode 41 and output terminals 52, while diode 48 is connected between the anode of diode 42 and output terminals 53. Diodes 47 and 48 provide a second current flow path for transistors 21 and 25 and also operate as current switches. Terminals 52 and 53 can be directly connected to the inputs of a flip-flop, not shown, to provide a direct-current path. The flip-flop input circuits should be returned to the same potential as secondary winding 45 as indicated by the letter "E" present at the three points. Resistors 36 and 39 are used to assure diodes 47 and 48 respectively, are back biased when their associated transistor is non-conducting. This is done to prevent $I_{co}$ from entering the flip-flop during this period.

Figure 2:
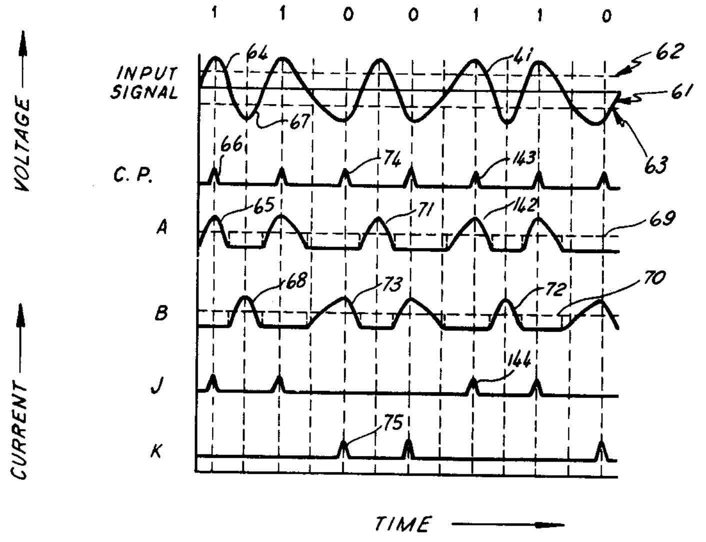
Fig. 2 is a graph illustrating waveforms taken at various points throughout the circuit of Fig. 1.

In discussing the operation of the circuit of Fig. 1, reference is now made to Fig. 2 wherein the abscissa represents time and the ordinate current in part and voltage in part, as indicated by the arrows thereon. Input signal 61 was taken by measuring the voltage across the terminals of primary winding 15. The input signal may be limited by read amplifier 13 as indicated by the dashed lines 62 and 63 which would be the maximum amplitude in each direction if such were the case. Curve A was taken by measuring the current flowing at point A while curve B was taken by measuring the current flowing at point B. If input signal 61 were limited, the maximum amplitude of curves A and B would be as indicated by dashed lines 69 and 70. The control signal wave marked C. P. was taken by measuring the voltage across the terminals of primary winding 44 of transformer 43. Output signals J and K were taken by measuring the current flowing at terminals 52 and 53, respectively.

As magnetic drum 11 rotates, voltage is induced in reading head 12 from the information stored on drum 11 in magnetic form. This information is applied to read amplifier 13 where it is amplified and if desired limited and then applied to primary winding 15 of transformer 14. The input signal is then coupled by the normal transformer action to bases 24 and 28 of transistors 21 and 25, respectively. The transformer is wound to cause the polarities in the primary and secondary windings thereof to be as indicated by the polarity dots.

Assume at this point that the input signal is positive going at the unmarked terminal of primary winding 15, as shown at 64. This causes the polarity of the signal appearing at base 24 to be negative going. This, in turn, results in forward biasing the emitter-base section of transistor 21, thus causing transistor 21 to become conducting. Current flows through resistor 35 and reaches point A as shown at 65, where it sees the two current flow paths including diodes 41 and 47. Since battery 46 applies a negative potential to the cathode of diode 41, it will be forward biased and will present a very low impedance to current flow. At the same time, diode 47 is back biased, since the voltage to which it is returned is slightly less negative than battery 46 as indicated by the "E" at terminal 52, and therefore the impedance which it presents is somewhat greater.

Therefore, the current flows through diode 41 to transformer 43 which causes the pulse of current to be absorbed by clock pulse generator 51. During the time transistor 21 is conducting in response to input signal 61, transistor 25 will be non-conducting since the signal applied to its base is positive going, thus biasing the emitter-base section thereof in the reverse direction.

If during the time transistor 21 is conducting, a positive going clock pulse signal is applied to the cathode of diode 41 from clock pulse generator 51, as shown at 66, diode 41 will be back biased since its cathode will become more positive than its anode. Therefore, diode 41 will present a relatively high impedance to the flow of current from transistor 21. During the period of time that clock pulse signal 66 is applied, current will flow through diode 47 since the impedance in this path is now much less than that through diode 41 and into the flip-flop causing it to react in the conventional manner.

If input signal 61 now becomes negative going, as shown at 67, the emitter-base section of transistor 21 becomes back biased, thus causing the transistor to become non-conducting, and the current floating at point A to return to its zero state. At the same time, however, the emitter-base section of transistor 25 becomes forward biased and current begins to flow therethrough. This causes a pulse of current as shown at 68 to appear at point B. Since no control signal is applied from clock pulse generator 51 during the presence of pulse 68, no signal appears at terminals 53 since the current is absorbed by generator 51. This also occurs at other times during the presence of current pulses at A or B as seen from pulses 71 and 72 on Fig. 2. If, however, a pulse of current is present at point B such as 73 and at some time a control signal such as 74 is applied, a signal will appear at terminal 53 as shown at 75. The operation of the circuit with respect to diodes 42 and 48 is identical to that just described with respect to diodes 41 and 47, respectively. It is thus seen that current switches are provided which close or open in response to the application of a control or clock pulse signal from the clock pulse generator, and cause current to flow either toward or away from the load.

It will be noted from Fig. 2 that when a binary 1 is indicated, input signal 61 is positive going at the time a clock pulse is applied and that a binary 0 is represented when input signal 61 is negative going at the time a clock pulse signal is applied. During each period of time when the input signal 61 is positive going, a pulse of current flows at point A and when input signal 61 is negative going, a pulse of current flows at point B in the circuit of Fig. 1, as seen from curves A and B on Fig. 2. However, output signals J and K do not necessarily appear when pulses of current flow at points A and B. As hereinabove described, unless a clock pulse signal is applied through transformer 43, current pulses appearing at points A and B are bypassed through diodes 41 and 42, thus no signal appears at terminals 52 or 53. This is further indicated by the lack of an output signal J or K during the time when current pulses 67, 71, and 72 are present.

While the circuit of Fig. 1 is adequate in many applications, it does have some limitations. The turn-off of each of the transistors from its conducting state is accomplished only by the voltage swing appearing on the base. This may cause unnecessary loading of the read amplifier. A further limitation is that the current through the transistors in this circuit is determined by the voltage swing on the bases in conjunction with resistors 31 and 32. Therefore, if the voltage swing is large enough, enough currnt may flow through the transistors to cause them to enter current saturation. If the pulse recurrence frequency of the clock pulses is great enough, some trouble may be encountered from this saturation due to minority carrier storage. In order to overcome these limitations, the circuit as shown in Fig. 3 was developed.

Figure 3:
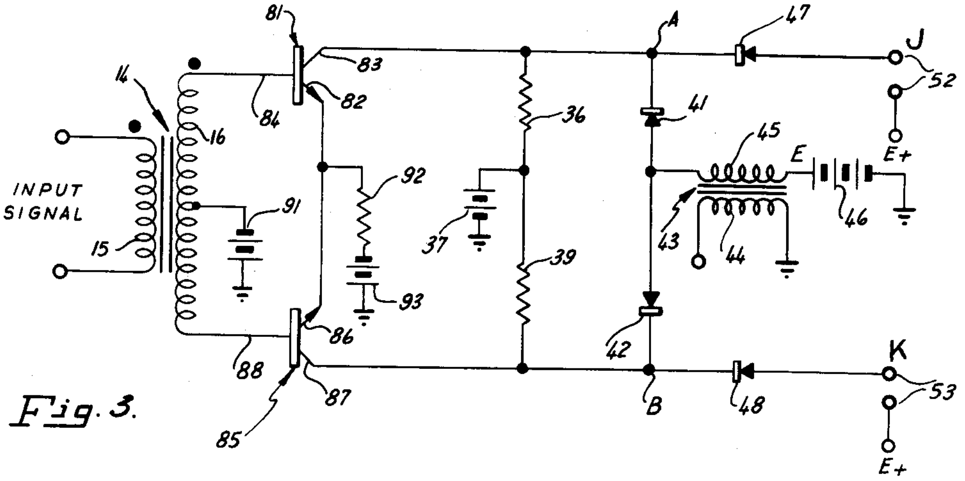
Fig. 3 is a schematic circuit diagram of the preferred embodiment of the current gate of the present invention.

The preferred embodiment of the present invention as illustrated by Fig. 3 includes a transistor 81 having an emitter 82, a collector 83, and a base 84. Another transistor 85 having an emitter 86, a collector 87, and a base 88 is also shown. Transistors 81 and 85 in the presently preferred embodiment are shown to be N–P–N transistors by their accepted schematic symbol and are junction transistors.

Emitters 82 and 86 are connected together and returned through a resistor 92 to the negative terminal of a source of operating potential 93 which has its positive terminal grounded. The terminals of secondary winding 16 of transformer 14 are connected to bases 84 and 88, while the center tap of secondary winding 16 is connected to the negative terminal of the source of potential such as battery 91 which has its positive terminal grounded. It will be noted that the primary and secondary windings of transformer 14 in this embodiment are wound to provide polarities of the applied input signal as shown by the polarity dots thereon. The remainder of the circuit as shown in Fig. 3 is identical to that shown in Fig. 1 with the exception that resistors 35 and 38 have been eliminated and the polarities of the diodes and the applied potentials have been reversed because N–P–N transistors are used herein as distinguished from P–N–P transistors which were used in the embodiment of Fig. 1.

Transistor 81 or 85 is caused to enter its conducting state in the presently preferred embodiment when the input signal which is coupled by transformer 14 from the read amplifier is positive going on base 84 or 88, respectively. When the signal is positive going, the emitter-base section of the transistor is forward biased and current flows. The operation of the remainder of the circuit of Fig. 3 is identical to that discussed above for Fig. 1 except that all currents flow in the opposite direction and the pulses of current shown in Fig. 2 on curves A and B will be negative instead of positive. Furthermore, the clock pulses applied through transformer 43 will also be negative in order to back bias diodes 41 and 42 upon application thereof.

Since emitters 82 and 86 are connected together in the presently preferred embodiment of the present invention, when one transistor is conducting and the applied input signal changes from a previous state having a positive polarity to a state having a negative polarity, for example on base 84, and the input signal is in the reverse polarity on base 88, emitter 82 will tend to follow base 84 in a negative direction until such a time as transistor 85 begins to conduct. Thus, it is seen that each transistor aids the other in becoming conducting or non-conducting since no resistors appear in the emitter circuit and the emitters are connected directly together. This results in a very rapid turn-off and turn-on time and further in sharp square pulses of current appearing at A and B as indicated by the dotted wave shapes on Fig. 2. Although the circuits of Fig. 1 and Fig. 3 are designed for use with Manchester type magnetic recording, they may be used with conventional non-return-to-zero (NRZ) or return-to-zero (RZ) type recording by simple modifications. In Fig. 3 an additional diode having its anode connected to ground may be connected to emitters 82 and 86. In Fig. 1 the junction between resistors 31 and 32 may be connected to ground while the center tap of secondary winding may be connected to a positive potential. In either embodiment the result is to assure non-conduction of both transistors unless an input signal is applied to the base thereof.

While it will be understood that the circuit specifications will vary according to any design consideration, the following list of components is included by way of example only for the circuit of Fig. 3 which has an input signal having a frequency of 200 kilocycles per second.

| | |
|---|---|
| Transistors 81, 85 | Texas instruments junction transistor type TI 2N137. |
| Resistors 36, 39 | 150,000 ohms. |
| Battery 91 | 4 volts. |
| Battery 93 | 30 volts |
| Battery 37 | 30 volts |
| Battery 46 | 3 volts. |
| Transformer 14 | Core Ferroxcube type 3C-7F160. Primary winding 100 turns. Secondary winding 200 turns. |
| Transformer 43 | Pacific Coast Associates type PCA 101-1. |
| Diodes 41, 42, 47, 48 | Hughes Aircraft Co. silicon junction type HD 6008. |

Figure 4:
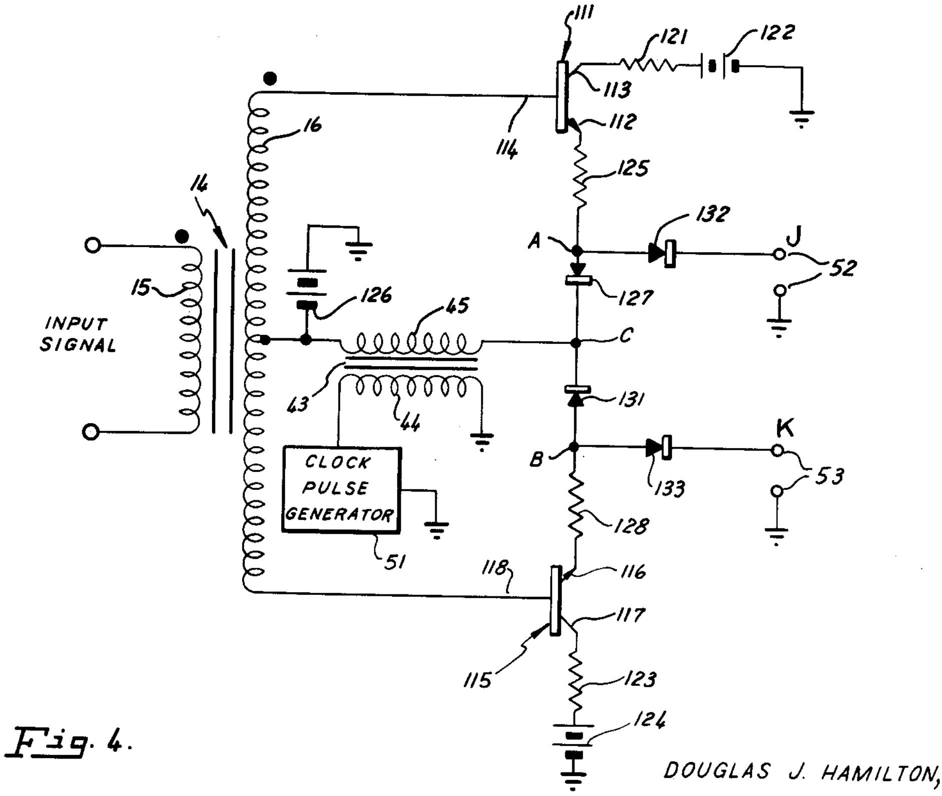
Fig. 4 is a schematic circuit diagram of a further embodiment of the current gate of the present invention.

Reference is now made to Fig. 4 wherein there is shown still another embodiment of the current gate of the present invention. This embodiment may be utilized when it becomes impossible to return the flip-flop input circuit to the same potential level as secondary winding 45 of transformer 43 which is necessary for proper operation of the circuits shown in Figs. 1 and 3.

Fig. 4 shows a transistor 111 having an emitter 112, a collector 113, and a base 114. Another transistor 115 having an emitter 116, a collector 117, and a base 118 is also shown. Transistors 111 and 115 as shown by their accepted schematic symbols are N–P–N transistors and in the presently preferred embodiment are junction transistors. Transformer 14 is once again shown to be wound to apply the input signal with the polarities as shown by the markings thereon. Secondary winding 16 is connected across bases 114 and 118. Collector 113 is connected to a resistor 121. A source of operating potential 122 is connected between resistor 121 and ground, its negative terminal being grounded. Resistor 123 and battery 124 are connected between collector 117 and ground, the negative terminal of battery 124 being grounded. Secondary winding 45 of transformer 43 is connected between the center tap of secondary winding 16 and point C, primary winding 44 of transformer 43 being connected across the output terminals of clock pulse generator 51. A source of biasing potential such as battery 126 has its negative terminal connected to the center tap of secondary winding 16 and its positive terminal connected to ground.

A resistor 125 and a diode 127 are connected in series between emitter 112 and point C. Connected between emitter 116 and point C are resistor 128 and diode 131. The cathodes of diodes 127 and 131 are connected together at point C. Connected between the junction of resistor 125 and diode 127 and one of output terminals 52 is another diode 132. Connected between the junction of diode 131 and resistor 128 and one of output terminals 53 is diode 133.

Assuming now that input signal 61 is positive going at base 114 as shown at 141 on Fig. 2 and negative going at base 118, the emitter-base section of transistor 111 will be forward biased, thus causing current to flow through transistor 111. This causes a pulse of current to appear at point A as shown at 142. If no clock pulse signal is applied at this time the current will flow through diode 127 and through secondary winding 45, causing the power represented by this current pulse to be absorbed by clock pulse generator 51 as hereinabove described. If at any time during the duration of this pulse of current a positive-going clock pulse such as 143 is applied, diode 127 will be back biased, presenting a relatively high impedance to the flow of current therethrough. This causes the current to then flow through diode 132 and into the flip-flop input which is connected to terminals 52 as shown at 144.

The operation of the remainder of the circuit of Fig. 4 is identical to that described hereinabove and need not be further considered at this point.

There have been thus disclosed several embodiments of a transistor current gate which utilizes the fact that a transistor is essentially a current device and which eliminates the inherent time lag normally present in transistor or vacuum tube flip-flops as currently known in the prior art.

What is claimed is:

1. A transistor current gate for converting a signal obtained from a magnetic storage device into usable information for application to flip-flop circuits comprising: first and second junction transistors each including input, output, and control electrodes; a source of input signals; coupling means connected between said input signal source and said input electrodes for applying the input signals to said transistors; a source of potential; current control means connected between said control electrodes and said source of potential for determining the amount of current which will flow through said transistors in response to application of the input signals; first and second current flow paths connected across the control and output electrodes of said first transistor; third and fourth current flow paths connected across the control and output electrodes of said second transistor; and means connected to said first and third current flow paths for preventing current flow in said first and third paths in response to a control signal, said first and third current flow paths being adapted to present a low impedance to the output current of said first and second transistors respectively in the absence of a control signal, whereby output current flows in one of said first and third current flow paths during the absence of a control signal and in one of said second and third current flow paths during the presence of a control signal.

2. A transistor current gate for converting a signal obtained from a magnetic storage device into usable information for application to flip-flop circuits comprising: first and second junction transistors each including input, output, and control electrodes; a source of input signals; coupling means connected between said input signal source and said input electrodes for applying the input signals to said transistors; a source of potential; current control means connected between said control electrodes and said source of potential for determining the amount of current which will flow through said transistors in response to application of the input signals; a pair of current switches connected across both of said output electrodes; at least one additional current switch connected to each of said output electrodes; and means for applying a control signal connected to said pair of current switches, whereby said pair of current switches is closed only during the absence of the control signal and one of said additional current switches is closed only during the presence of the control signal.

3. A transistor current gate for converting a signal obtained from a magnetic storage device into usable information for application to flip-flop circuits comprising: first and second junction transistors each including input, output, and control electrodes; a source of input signals; coupling means connected between said input signal source and said input electrodes for applying the input signals to said transistors; a source of potential; current control means connected between said control electrodes and said source of potential for determining the amount of current which will flow through said transistors in response to application of the input signals; first and second current flow paths, each including a current switch, said current switches being connected between said output electrodes; a third current flow path including a current switch connected to one of said output electrodes; a fourth current flow path including a current switch connected to the other of said output electrodes; and means for applying a control signal connected to said first and second current flow paths, whereby said current switches in said first and second current flow paths are closed only during the absence of the control signal and one of said current switches in said third and fourth paths is closed only during the presence of the control signal.

4. A transistor current gate for converting a signal obtained from a magnetic storage device into usable information for application to flip-flop circuits comprising: a first junction transistor including a first emitter, a first collector, and a first base; a second junction transistor including a second emitter, a second collector, and a second base; a source of input signals; coupling means connected between said source of input signals and said first and second bases for applying the input signals to said transistors; a source of potential; means for controlling current flow through said transistors connected between said emitters and said source of potential; first and second current flow paths, each including a current switch connected to said first and second collectors, respectively; third and fourth current flow paths, each including a current switch connected to said first and second collectors, respectively; and means for applying a control signal connected to said first and second current flow paths, whereby said current switches in said first and second current flow paths are closed only during the absence of the control signal and one of said current switches in said third and fourth paths is closed only during the presence of the control signal.

5. A transistor current gate for converting a signal obtained from a magnetic storage device into usable information for application to flip-flop circuits comprising: a first junction transistor including a first emitter, a first collector, and a first base; a second junction transistor including a second emitter, a second collector, and a second base; a first source of potential; a source of input signals; a first transformer including a primary winding and a secondary winding, said secondary winding having a center tap, said primary winding being connected across said source of input signals, said secondary winding being connected across said first and second bases, said center tap being connected to said first source of potential; first and second resistive impedance elements connected in series between said first and second emitters for determining the amount of current which will flow through said transistors in response to the application of the input signal, the junction between said first and second resistive impedance elements being connected to said center tap; a second source of potential; third and fourth resistive impedance elements connected between said first and second collectors, respectively, and said second source of potential; first and second rectifying means connected to said first collector and in parallel to each other; third and fourth rectifying means connected to said second collector and in parallel to each other, said first and third rectifying means being connected together at a common junction point; a source of control signals; a third source of potential; and a second transformer including a primary winding and a secondary winding, said secondary winding being connected between said common junction point and said third source of potential, said primary winding being connected to said source of control signals, whereby said first and third rectifying means are allowed to conduct only during the absence of a control signal and one of said third and fourth rectifying means is allowed to conduct only during the presence of a control signal.

6. The transistor current gate as defined in claim 5 wherein said transistors are P–N–P junction transistors and said rectifying means are semiconductor diodes, said first and second diodes having their anodes connected to said first collector and said third and fourth diodes having their anodes connected to said second collector.

7. A transistor current gate for converting a signal obtained from a magnetic storage device into usable information for application to flip-flop circuits comprising: a first junction transistor including a first emitter, a first collector, and a first base; a second junction transistor including a second emitter, a second collector, and a second base, said first and second emitters connected together; a first source of potential; a first resistive impedance element connected between said emitters and said first source of potential; a source of input signals; a first transformer including a primary winding and a secondary winding, said secondary winding including a center tap, said secondary winding being connected across said first and second bases, said primary winding being connected across said source of input signals; a second source of potential; second and third resistive impedance elements connected in series between said first and second collectors, the junction between said second and third impedance elements being connected to said second source of potential; first and second rectifying means connected to said first collector and in parallel to each other; third and fourth rectifying means connected to said second collector and in parallel to each other, said first and third rectifying means being connected together at a common junction point; a source of control signals; a third source of potential; and a second transformer including a primary winding and a secondary winding, said secondary winding being connected between said common junction point and said third source of potential, said primary winding being connected to said source of control signals, whereby said first and third rectifying means are allowed to conduct only during the absence of a control signal and one of said third and fourth rectifying means is allowed to conduct only during the presence of a control signal.

8. The transistor current gate as defined in claim 7 wherein said first and second transistors are N–P–N junction transistors and said rectifying means are semiconductor diodes, said first and second diodes having their cathodes connected to said first collector, and said third and fourth diodes having their cathodes connected to said second collector.

9. A transistor current gate for converting a signal obtained from a magnetic storage device into usable information for application to flip-flop circuits comprising: a first junction transistor including a first emitter, a first collector, and a first base; a second junction transistor including a second emitter, a second collector, and a second base; a source of input signals; a first transformer including a primary winding and a secondary winding, said secondary winding having a center tap, said primary winding being connected to said source of input signals, said secondary winding being connected to said first and second bases; a first source of potential; a first impedance element connected between said first collector and said first source of potential; a second source of potential; a second impedance element connected between said second collector and said second source of potential; third and fourth resistors connected to said first and second emitters, respectively; first and second diodes connected in series between said third and fourth resistors; a source of control signals; a third source of potential; a second transformer including a primary winding and a secondary winding of said second transformer, the secondary winding being connected between the junction of said first and second diodes and said center tap, said center tap being connected to said third source of potential, the primary winding of said second transformer being connected to said source of control signals; a third diode connected to the junction between said third resistor and said first diode; and a fourth diode connected to the junction between said fourth resistor and said second diode, whereby said first or said second diode is allowed to conduct only during the absence of a control signal and said third or said fourth diode is allowed to conduct only during the presence of a control signal.

10. The transistor current gate as defined in claim 9 wherein said dioes are semiconductor diodes and said first and third diodes have their anodes connected together, said second and fourth diodes have their anodes connected together, and said first and second diodes have their cathodes connected together.

References Cited in the file of this patent

UNITED STATES PATENTS

| | | |
|---|---|---|
| 2,344,633 | Pfleger | Mar. 21, 1944 |
| 2,438,947 | Rieke et al. | Apr. 6, 1948 |
| 2,673,936 | Harris | Mar. 30, 1954 |
| 2,698,427 | Steele | Dec. 28, 1954 |
| 2,706,811 | Steele | Apr. 19, 1955 |

UNITED STATES PATENT OFFICE

CERTIFICATE OF CORRECTION

Patent No. 2,840,726 June 24, 1958

Douglas J. Hamilton

It is hereby certified that error appears in the printed specification of the above numbered patent requiring correction and that the said Letters Patent should read as corrected below.

Column 4, line 24, for "floating" read --flowing--; line 72, for "currnt" read --current--.

Signed and sealed this 7th day of October 1958.

(SEAL)

Attest:

KARL H. AXLINE

Attesting Officer

ROBERT C. WATSON

Commissioner of Patents